US010458714B2

(12) United States Patent
Veilleux, Jr.

(10) Patent No.: US 10,458,714 B2
(45) Date of Patent: Oct. 29, 2019

(54) HEAT EXCHANGER ASSEMBLY

(71) Applicant: Hamilton Sundstrand Corporation, Charlotte, NC (US)

(72) Inventor: Leo J. Veilleux, Jr., Wethersfield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 67 days.

(21) Appl. No.: 15/677,360

(22) Filed: Aug. 15, 2017

(65) Prior Publication Data
US 2019/0056178 A1 Feb. 21, 2019

(51) Int. Cl.
F28D 9/02 (2006.01)
F28D 9/00 (2006.01)
F28F 9/00 (2006.01)
F28F 9/02 (2006.01)
F28F 7/02 (2006.01)
F28D 7/00 (2006.01)
B33Y 80/00 (2015.01)
B33Y 99/00 (2015.01)

(52) U.S. Cl.
CPC ......... F28D 9/0006 (2013.01); B33Y 80/00 (2014.12); B33Y 99/00 (2014.12); F28D 7/0008 (2013.01); F28D 9/02 (2013.01); F28F 7/02 (2013.01); F28F 9/001 (2013.01); F28F 9/0243 (2013.01); F28F 2009/0287 (2013.01); F28F 2255/18 (2013.01)

(58) Field of Classification Search
CPC combination set(s) only.
See application file for complete search history.

(56) References Cited

U.S. PATENT DOCUMENTS 4,116,271 A * 9/1978 De Lepeleire ........ F28D 9/0006
165/166
5,088,552 A * 2/1992 Raunio ..................... F28D 9/00
165/165
5,832,993 A * 11/1998 Ohata ................... F28D 9/0012
165/166

(Continued)

FOREIGN PATENT DOCUMENTS

CN 106440522 A * 2/2017
EP 3173724 A1 11/2016

(Continued)

OTHER PUBLICATIONS

European Search Report for European Application No. 18188880.1; Date of Completion: Jan. 10, 2019; 5 Pages.

Primary Examiner — Devon Russell
(74) Attorney, Agent, or Firm — Cantor Colburn LLP

(57) ABSTRACT

A heat exchanger assembly includes a shell, a first inlet duct, and a second inlet duct. The shell has a core that is provided with a plurality of first fluid channels and a plurality of second fluid channels. The first inlet duct has a plurality of first feed channels extending towards and fluidly connected to the plurality of first fluid channels. The second inlet duct has a plurality of second feed channels extending towards and fluidly connected to the plurality of second fluid channels. The plurality of first feed channels are interwoven with the plurality of second feed channels proximate an intersection region between the first inlet duct and the second inlet duct.

20 Claims, 2 Drawing Sheets

(56) References Cited

U.S. PATENT DOCUMENTS

| | | | | |
|---|---|---|---|---|
| 5,915,469 A * | 6/1999 | Abramzon | ............ | B64D 13/00 |
| | | | | 165/134.1 |
| 9,714,796 B2 * | 7/2017 | Heinio | ...................... | F28F 9/00 |
| 2012/0273173 A1 * | 11/2012 | Angermann | .......... | F28D 9/0037 |
| | | | | 165/134.1 |
| 2014/0000842 A1 * | 1/2014 | Gruneisen | ............... | F28F 9/001 |
| | | | | 165/76 |
| 2017/0131035 A1 * | 5/2017 | Honnorat | .................. | F02C 7/14 |

FOREIGN PATENT DOCUMENTS

| | | | | |
|---|---|---|---|---|
| EP | 3258204 A1 | 3/2017 | | |
| EP | 3228971 A1 | 4/2017 | | |
| FR | 1589802 A * | 4/1970 | ............... | F28D 7/16 |
| FR | 3034855 A1 * | 10/2016 | ........... | F28D 9/0006 |
| JP | 2008157592 A * | 7/2008 | ............ | B01J 19/249 |
| WO | WO-2012089927 A2 * | 7/2012 | ............. | F28F 3/046 |
| WO | 2017008108 A1 | 1/2017 | | |

* cited by examiner

HEAT EXCHANGER ASSEMBLY

BACKGROUND

Exemplary embodiments pertain to the art of heat exchanger assemblies.

Heat exchangers may be employed in a variety of systems that require cooling or heating of a fluid. Some systems may be subjected to high temperatures, rapidly changing thermal gradients, or high pressures. The high temperatures, rapidly changing thermal gradients, high pressures may lead to high stresses that may structurally impact the heat exchangers. Accordingly, it is desirable to provide improved heat exchanger geometry to reduce thermal or other stresses.

BRIEF DESCRIPTION

Disclosed is a heat exchanger assembly. The heat exchanger assembly includes a shell, a plurality of first feed channels, and a plurality of second feed channels. The shell has a core disposed therein and the core is provided with a plurality of first fluid channels and a plurality of second fluid channels. The plurality of first feed channels extending towards and fluidly connected to the plurality of first fluid channels. The plurality of second feed channels extending towards and fluidly connected to the plurality of second fluid channels. The plurality of first feed channels are interwoven with the plurality of second feed channels.

In addition to one or more of the features described herein, the plurality of first feed channels and the plurality of second feed channels are interwoven in an alternating arrangement.

In addition to one or more of the features described herein, a first feed channel of the plurality of first feed channels that is disposed adjacent to a second feed channel of the plurality of second feed channels share a common wall.

In addition to one or more of the features described herein, the common wall segregates a first fluid flow within the first feed channel from a second fluid flow within the second feed channel.

In addition to one or more of the features described herein, the shell is at least one of a spherical shell and an elliptical shell.

In addition to one or more of the features described herein, the plurality of first feed channels are defined by a first inlet duct operatively connected to the shell that is a cylindrical inlet duct.

In addition to one or more of the features described herein, the plurality of second feed channels are defined by a second inlet duct operatively connected to the shell that has a second inlet duct first portion and a second inlet duct second portion extending between the second inlet duct first portion and the shell.

In addition to one or more of the features described herein, the second inlet duct first portion is cylindrical.

In addition to one or more of the features described herein, the second inlet duct second portion has a first diameter proximate the second inlet duct first portion and has a second diameter proximate the shell.

In addition to one or more of the features described herein, the second diameter is greater than the first diameter.

Also disclosed is a heat exchanger assembly. The heat exchanger assembly includes a core disposed within a shell, at least one of a first inlet duct and a first outlet duct, and at least one of a second inlet duct and a second outlet duct. The core is provided with a plurality of first fluid channels and a plurality of second fluid channels. At least one of a first inlet duct has a plurality of first feed channels connected to the plurality of first fluid channels and a first outlet duct has a plurality of first exit channels. At least one of a second inlet duct has a plurality of second feed channels fluidly connected to the plurality of second fluid channels and a second outlet duct has a plurality of second exit channels. The plurality of first feed channels being interwoven with at least one of the plurality of first exit channels and the plurality of second exit channels.

In addition to one or more of the features described herein, the plurality of first feed channels and the plurality of second feed channels are interwoven in an alternating arrangement such that a first feed channel of the plurality of first feed channels is disposed adjacent to a second feed channel of the plurality of second feed channels.

In addition to one or more of the features described herein, a common wall is disposed between the first feed channel and the second feed channel.

In addition to one or more of the features described herein, the common wall extends from an intersection region between the first inlet duct and the second inlet duct towards the core.

In addition to one or more of the features described herein, the common wall is disposed between the plurality of first fluid channels and the plurality of second fluid channels.

In addition to one or more of the features described herein, the first inlet duct is operatively connected to the shell and extends along a first axis.

In addition to one or more of the features described herein, the first outlet duct is operatively connected to the shell and extends along the first axis.

In addition to one or more of the features described herein, the second inlet duct is operatively connected to the shell and extends along a second axis that is disposed orthogonal to the first axis.

In addition to one or more of the features described herein, the second inlet duct is operatively connected to the shell and extends along a second axis that is disposed parallel to the first axis.

In addition to one or more of the features described herein, the second outlet duct is operatively connected to the shell and extends along the second axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
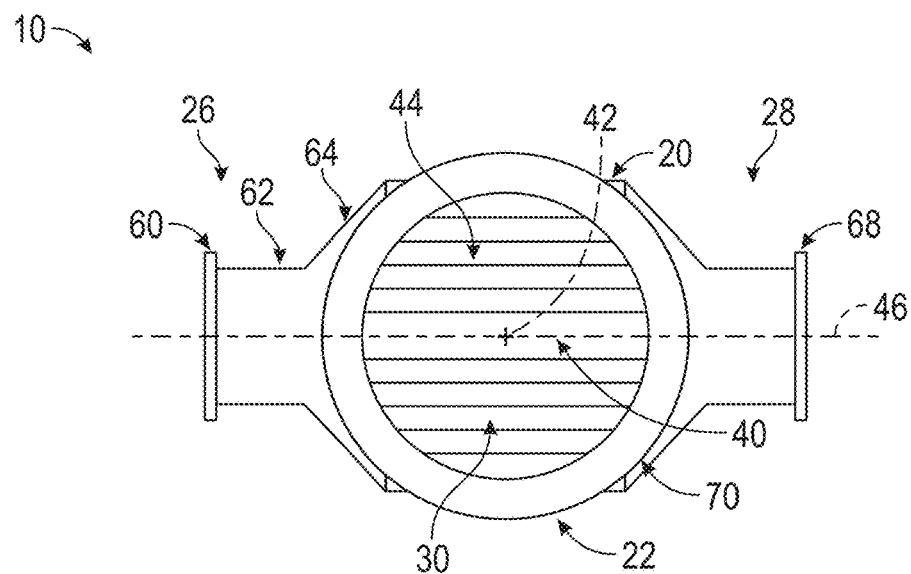
FIG. 1 is a first view of a heat exchanger assembly.
Figure 2:
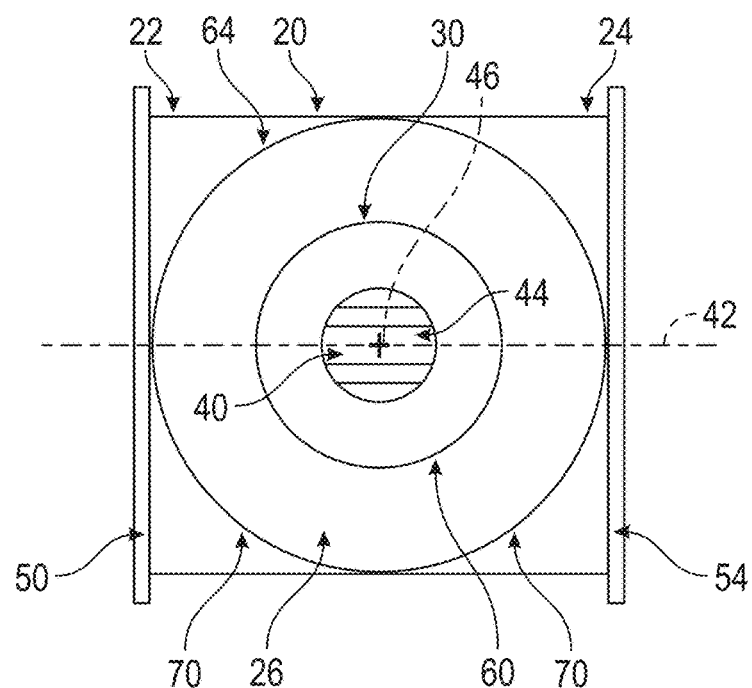
FIG. 2 is a second view of the heat exchanger assembly.

Referring to FIGS. 1 and 2, a heat exchanger assembly 10 is shown. The heat exchanger assembly 10 includes a shell 20, a first inlet duct 22, a first outlet duct 24, a second inlet duct 26, and a second outlet duct 28.

The shell 20 may be configured as a spherical shell, elliptical shell, or a cylindrical or tubular shell that is made by an additive manufacturing process. A core 30 is disposed within the shell 20 and a fluid is routed into the core 30 for cooling or heating. The fluid may subject the shell 20 of the heat exchanger assembly 10 to extremely high temperatures, rapidly changing thermal gradients, or high pressures. The lack of corners of the shell 20 inhibits or reduces the geometric and thermal discontinuities that may lead to high stress thus making the shape of the shell 20 improved as compared to rectangular or cylindrical heat exchanger shells having sharp corners.

The core 30 is disposed within the shell 20 and has a shape that is substantially similar to the shape of the shell 20. The core 30 may be made by an additive manufacturing process. For example, should the shell 20 have a spherical shape or elliptical shape, the core 30 also has a spherical shape or elliptical shape.

The core 30 includes a plurality of layers or flow passages or fluid channels that are stacked upon each other. The plurality of layers or flow passages or fluid channels may have a tubular shape, rectangular shape, or other shape. The layers or flow passages or fluid channels that are disposed proximate the center of the shell 20 have matched impedance with the layers or flow passages or fluid channels that are spaced apart from the center of the shell 20. A height, width, or length (or ratio between the height or width or length) of the layers or flow passages or fluid channels that are spaced apart from the center of the shell 20 may be different from the height, width, or length of the layers that are disposed proximate the center of the shell 20, such that the longest flow paths within the core 30 that are disposed proximate the center of the shell 20 have a matched impedance with the shorter flow paths within the core that are spaced apart from the center of the shell 20.

Figure 3:
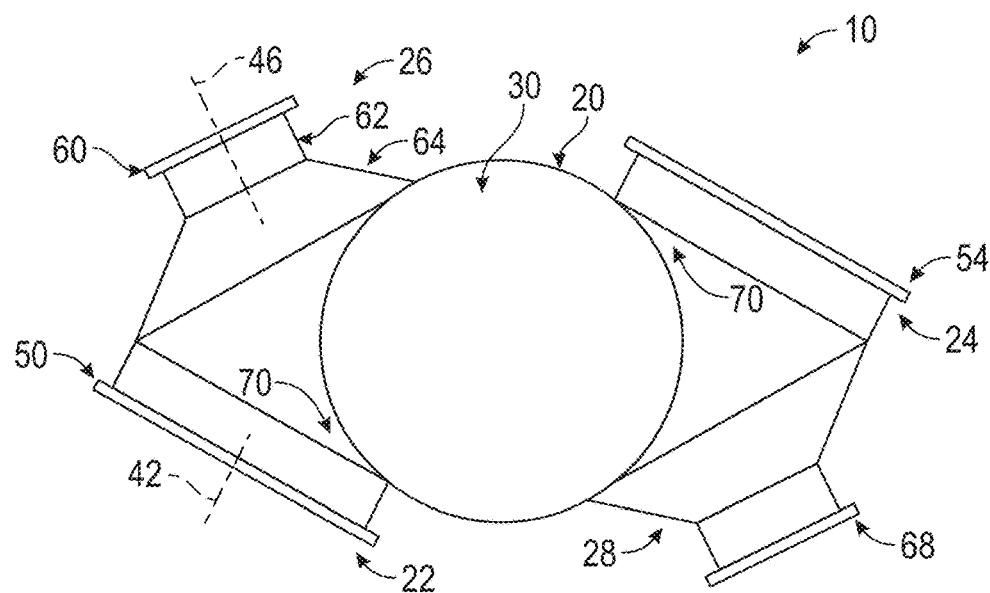
FIG. 3 is a view of another heat exchanger assembly.
Figure 4:
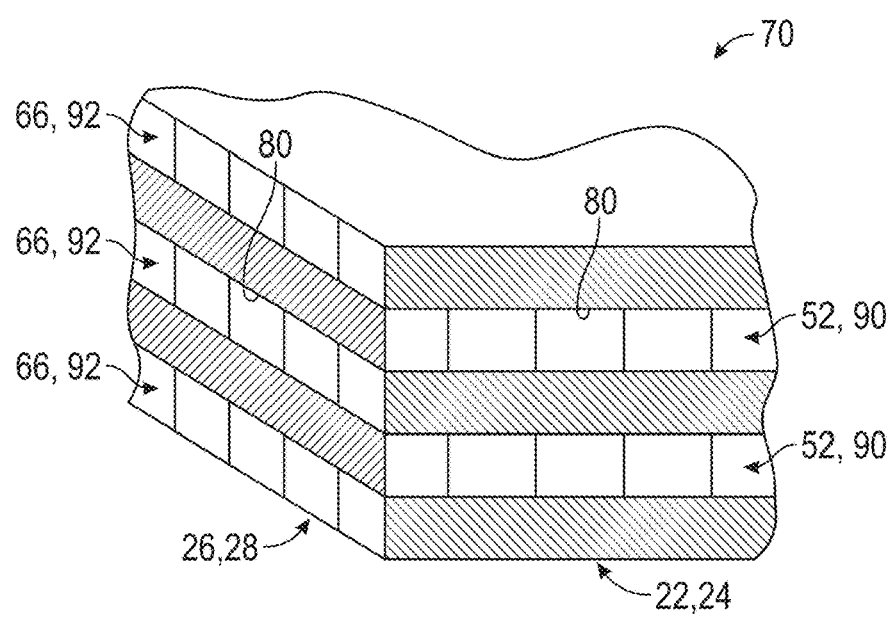
FIG. 4 is a cross sectional view of interwoven feed channels of an intersection region of the heat exchanger assembly.

A first layer of the plurality of layers includes or defines a plurality of first fluid channels 40 extending along a first axis 42. A second layer of the plurality of layers is stacked on or disposed on the first layer. The second layer includes or defines a plurality of second fluid channels 44 extending along a second axis 46. The first axis 42 is disposed orthogonal to the second axis 46 and as such, the plurality of first fluid channels 40 are disposed orthogonal or at an angle relative to the plurality of second fluid channels 44, such that orthogonal flow (as shown in FIGS. 1-3) or parallel flow, or counter flow (as shown in FIG. 4) is achieved.

The plurality of first fluid channels 40 defines a flow passage through the core 30 that flows in a direction substantially parallel to the first axis 42. The plurality of second fluid channels 44 defines a flow passage through the core 30 that flows in a direction substantially parallel to the second axis 46, such that the fluid flows through the respective flow passages are disposed orthogonal to each other.

The first inlet duct 22 is operatively connected to the shell 20. The first inlet duct 22 extends about or extends along the first axis 42 between the shell 20 and a first mounting flange 50. The first inlet duct 22 may have a generally cylindrical or tubular shape such that is a cylindrical inlet duct provided with a substantially constant first inlet duct diameter between the first mounting flange 50 and the shell 20. The first inlet duct 22 may have a first inlet duct diameter that is approximately equal to the diameter of the shell 20.

The first inlet duct 22 defines a plurality of first feed channels 52. The plurality of first feed channels 52 may extend from an inner surface of the first inlet duct 22 proximate an intersection between the first inlet duct 22 and the shell 20. The plurality of first feed channels 52 extend towards and are fluidly connected to the plurality of first fluid channels 40. The plurality of first feed channels 52 direct a fluid that enters through the first inlet duct 22 towards the plurality of first fluid channels 40 of the core 30. The plurality of first feed channels 52 expand to a diameter that is equal to the diameter of the shell 20 and enter the shell 20 into the plurality of first fluid channels 40.

The first outlet duct 24 is operatively connected to the shell 20. The first outlet duct 24 is disposed opposite the first inlet duct 22 and extends about or extends along the first axis 42 between the shell 20 and a second mounting flange 54. The first outlet duct 24 may be provided with a plurality of first exit channels 90. The plurality of first exit channels 90 of the first outlet duct 24 may extend from an inner surface of the first outlet duct 24 proximate an intersection between the first outlet duct 24 and the shell 20. The plurality of first exit channels 90 of the first outlet duct 24 have a substantially similar configuration as a plurality of first feed channels 52 of the first inlet duct 22, as previously described. The plurality of first feed channels 52 of the first inlet duct 22 may be interwoven with the plurality of first exit channels 90 of the first outlet duct 24.

The second inlet duct 26 is operatively connected to the shell 20. The second inlet duct 26 extends about or extends along the second axis 46 between the shell 20 and a first mounting flange 60. The first mounting flange 60 may have a diameter that is substantially less than the diameter of the first mounting flange 50.

The second inlet duct 26 includes a second inlet duct first portion 62 and a second inlet duct second portion 64. The second inlet duct first portion 62 extends from the first mounting flange 60 towards the second inlet duct second portion 64 along the second axis 46. The second inlet duct first portion 62 may have a generally cylindrical or tubular shape provided with a substantially constant diameter that is less than the first inlet duct diameter. The second inlet duct second portion 64 extends between an end of the second inlet duct first portion 62 and the shell 20. The second inlet duct second portion 64 is configured as an expansion duct having a first diameter proximate the second inlet duct first portion 62 and expands to a second diameter that is disposed proximate the shell 20. The second diameter is greater than the first diameter and the second diameter is substantially equal to a diameter of the shell 20.

The second inlet duct 26 defines a plurality of second feed channels 66. The plurality of second feed channels 66 may extend from an inner surface of the second inlet duct 26 proximate an intersection between the second inlet duct 26 and the shell 20. The plurality of second feed channels 66 extend towards and are fluidly connected to the plurality of second fluid channels 44. The plurality of second feed channels 66 direct a fluid that enters through the second inlet duct 26 towards the plurality of second fluid channels 44 of the core 30. The plurality of second feed channels 66 expand to a diameter that is equal to the diameter of the shell 20 and enter the shell 20 into the plurality of second fluid channels 44.

The second outlet duct 28 is operatively connected to the shell 20. The second outlet duct 28 is disposed opposite the second inlet duct 26 and extends about or extends along the second axis 46 between the shell 20 and a second mounting flange 68. The second outlet duct 28 may have a substantially similar configuration as the second inlet duct 26. The second outlet duct 28 may be provided with a plurality of second exit channels 92. The plurality of second exit channels 92 of the second outlet duct 28 may extend from an inner surface of the second outlet duct 28 proximate an intersection between the second outlet duct 28 and the shell 20. The plurality of second exit channels 92 of the second outlet duct 28 may have a substantially similar configuration as the plurality of second feed channels 66 of the second inlet duct 26, as previously described. The plurality of first feed channels 52 of the first inlet duct 22 may be interwoven with the plurality of second exit channels 92 of the second outlet duct 28, proximate an intersection region between the first inlet duct 22 and the second outlet duct 28. The plurality of second feed channels 66 of the second inlet duct 26 may be interwoven with the plurality of second exit channels 92 of the second outlet duct 28, proximate an intersection region between the second inlet duct 26 and the second outlet duct 28.

Referring to FIG. 3, the heat exchanger assembly 10 may be arranged such that parallel flow or counter flow occurs within the core 30. In such an arrangement the first axis 42, along which the first inlet duct 22 extends, intersects and is disposed at a non-orthogonal angle with respect to the second axis 46, along which the second inlet duct 26 extends. As such, the first inlet duct 22 is disposed at an angle that is less than 90° relative to the second inlet duct 26. Furthermore, the first outlet duct 24 is disposed at a non-orthogonal angle relative to the second outlet duct 28. As such, the first outlet duct 24 is disposed at an angle that is less than 90° relative to the second outlet duct 28.

Referring to FIG. 4, the plurality of first feed channels 52 and the plurality of second feed channels 66 are interwoven, layered, or disposed adjacent to each other, but do not intersect because they are separated by layers or a common wall, proximate an intersection region 70 between the first inlet duct 22, the second inlet duct 26, and the shell 20 (as shown in FIG. 2). The intersection region 70 may also be between the first outlet duct 24 and the second inlet duct 26 or may also be between the first inlet duct 22 and the second outlet duct 28 or may also be between the first outlet duct 24 and the second outlet duct 28 (as shown in FIG. 1). The plurality of first feed channels 52 and the plurality of second feed channels 66 are made using an additive manufacturing process. Likewise, the plurality of first feed channels and the plurality of second feed channels of the first outlet duct 24 and the second outlet duct 28 are interwoven, layered, or disposed adjacent to each other, but do not intersect, proximate an intersection region between the first outlet duct 24, the second outlet duct 28, and the shell 20. Furthermore, the first inlet duct 22 and the second inlet duct 26 as well as the first outlet duct 24 and the second outlet duct 28 may share common walls with the plurality of first fluid channels 40 and the plurality of second fluid channels 44 to improve heat transfer.

The plurality of first feed channels 52 and the plurality of second feed channels 66 are interwoven in an alternating arrangement such that a first feed channel of the plurality of first feed channels 52 is disposed adjacent to, stacked on, or in an abutting arrangement with a second feed channel of the plurality of second feed channels 66 having a common wall section or a common wall 80 disposed between the first feed channel of the plurality of first feed channels 52 and the second feed channel of the plurality of second feed channels 66. The first feed channel of the plurality of first feed channels 52 and the second feed channel of the plurality of second feed channels 66 share the common wall 80.

The common wall 80 segregates a first fluid flow within the first feed channel of the plurality of first feed channels 52 from a second fluid flow within the second feed channel of the plurality of second feed channels 66. The common wall 80 segregates the first fluid flow from the second fluid flow at intersections of the first inlet duct 22 and the second inlet duct 26 to isolate the first fluid flow from the second fluid flow that are transitioning into the core 30. The common wall 80 extends from the intersection region 70 towards the core 30. In at least one embodiment, the common wall 80 terminates or is disposed between a first fluid channel of the plurality of first fluid channels 40 and a second fluid channel of the plurality of second fluid channels 44.

The common wall 80 segregates the first fluid flow that exits a first fluid channel of the plurality of first fluid channels 40 into an exit channel of at least one of the plurality of first exit channels 90 or the plurality of second exit channels 92 from the second fluid flow that exits a second fluid channel of the plurality of second fluid channels 44 into an exit channel of at least one of the plurality of first exit channels 90 or the plurality of second exit channels 92 to isolate the exiting first fluid flow from the exiting second fluid flow that are transitioning out of the core 30.

The separation or segregation of the first fluid flow within the first feed channel of the plurality of first feed channels 52 from the second fluid flow within the second feed channel of the plurality of second feed channels 66 by the common wall 80 provides additional heat transfer between the feed channels acting as a precooler to increase the heat exchanger assembly 10 thermal performance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A heat exchanger assembly, comprising:
a shell having a core disposed therein, the core being provided with a plurality of first fluid channels and a plurality of second fluid channels;
a plurality of first feed channels extending towards and fluidly connected to the plurality of first fluid channels; and
a plurality of second feed channels extending towards and fluidly connected to the plurality of second fluid chan- nels, the plurality of first feed channels being interwoven with the plurality of second feed channels,
wherein the core is a spherical core.

2. The heat exchanger assembly of claim 1, wherein the plurality of first feed channels and the plurality of second feed channels are interwoven in an alternating arrangement.

3. The heat exchanger assembly of claim 1, wherein a first feed channel of the plurality of first feed channels that is disposed adjacent to a second feed channel of the plurality of second feed channels share a common wall.

4. The heat exchanger assembly of claim 3, wherein the common wall segregates a first fluid flow within the first feed channel from a second fluid flow within the second feed channel.

5. The heat exchanger assembly of claim 1, wherein the plurality of first feed channels are defined by a first inlet duct operatively connected to the shell that is a cylindrical inlet duct.

6. The heat exchanger assembly of claim 1, wherein the plurality of second feed channels are defined by a second inlet duct operatively connected to the shell that has a second inlet duct first portion and a second inlet duct second portion extending between the second inlet duct first portion and the shell.

7. The heat exchanger assembly of claim 6, wherein the second inlet duct first portion is cylindrical.

8. The heat exchanger assembly of claim 6, wherein the second inlet duct second portion has a first diameter proximate the second inlet duct first portion and has a second diameter proximate the shell.

9. The heat exchanger assembly of claim 8, wherein the second diameter is greater than the first diameter.

10. A heat exchanger assembly, comprising:
a core disposed within a shell, the core being provided with a plurality of first fluid channels and a plurality of second fluid channels;
at least one of a first inlet duct having a plurality of first feed channels connected to the plurality of first fluid channels and a first outlet duct having a plurality of first exit channels; and
at least one of a second inlet duct having a plurality of second feed channels fluidly connected to the plurality of second fluid channels and a second outlet duct having a plurality of second exit channels, the plurality of first feed channels being interwoven with at least one of the plurality of first exit channels and the plurality of second exit channels,
wherein the shell is a spherical shell, and
wherein the core is a spherical core.

11. The heat exchanger assembly of claim 10, wherein the plurality of first feed channels and the plurality of second feed channels are interwoven in an alternating arrangement such that a first feed channel of the plurality of first feed channels is disposed adjacent to a second feed channel of the plurality of second feed channels.

12. The heat exchanger assembly of claim 11, wherein a common wall is disposed between the first feed channel and the second feed channel.

13. The heat exchanger assembly of claim 12, wherein the common wall extends from an intersection region between the first inlet duct and the second inlet duct towards the core.

14. The heat exchanger assembly of claim 13, wherein the common wall is disposed between the plurality of first fluid channels and the plurality of second fluid channels.

15. The heat exchanger assembly of claim 10, wherein the first inlet duct is operatively connected to the shell and extends along a first axis.

16. The heat exchanger assembly of claim 15, wherein the first outlet duct is operatively connected to the shell and extends along the first axis.

17. The heat exchanger assembly of claim 15, wherein the second inlet duct is operatively connected to the shell and extends along a second axis that is disposed orthogonal to the first axis.

18. The heat exchanger assembly of claim 17, wherein the second outlet duct is operatively connected to the shell and extends along the second axis.

19. The heat exchanger assembly of claim 1, wherein plurality of first fluid channels are stacked within the core, and wherein a height of one of the plurality of first fluid channels spaced apart from a center of the shell is different than a height of another of the plurality of first fluid channels proximate the center of the shell.

20. A heat exchanger assembly, comprising:
a shell having a core disposed therein, the core being provided with a plurality of first fluid channels and a plurality of second fluid channels;
a plurality of first feed channels extending towards and fluidly connected to the plurality of first fluid channels; and
a plurality of second feed channels extending towards and fluidly connected to the plurality of second fluid channels, the plurality of first feed channels being interwoven with the plurality of second feed channels,
wherein the shell is an elliptical shell, wherein the core is an elliptical core.

* * * * *